(12) United States Patent
Lu et al.

(10) Patent No.: US 11,126,410 B2
(45) Date of Patent: Sep. 21, 2021

(54) METHOD AND APPARATUS FOR BUILDING PAGES, APPARATUS AND NON-VOLATILE COMPUTER STORAGE MEDIUM

(71) Applicant: BAIDU ONLINE NETWORK TECHNOLOGY (BEIJING) CO., LTD., Beijing (CN)

(72) Inventors: Rui Lu, Beijing (CN); Jie Meng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 114 days.

(21) Appl. No.: 15/760,563

(22) PCT Filed: Oct. 30, 2015

(86) PCT No.: PCT/CN2015/093382
§ 371 (c)(1),
(2) Date: Mar. 15, 2018

(87) PCT Pub. No.: WO2017/049715
PCT Pub. Date: Mar. 30, 2017

(65) Prior Publication Data
US 2019/0042549 A1    Feb. 7, 2019

(30) Foreign Application Priority Data

Sep. 23, 2015  (CN) .......................... 201510612614.X

(51) Int. Cl.
*G06F 17/00*    (2019.01)
*G06F 8/38*    (2018.01)
(Continued)

(52) U.S. Cl.
CPC .................. *G06F 8/38* (2013.01); *G06F 8/51* (2013.01); *G06F 8/65* (2013.01); *G06F 9/44* (2013.01);
(Continued)

(58) Field of Classification Search
CPC ...... G06F 16/93; G06F 17/248; G06F 40/143; G06F 9/44; G06F 9/451; G06F 16/972;
(Continued)

(56) References Cited

U.S. PATENT DOCUMENTS 8,584,002 B2 * 11/2013 Cave ...................... G06F 16/958
715/210
8,732,236 B2 * 5/2014 Altmaier ............... H04L 67/104
370/338
(Continued)

FOREIGN PATENT DOCUMENTS

CN    102207872 A    10/2011
CN    102520960 A    6/2012
(Continued)

OTHER PUBLICATIONS

Friedrich, 'Adjust Ulysses' Markup to Your Needs', Published Sep. 5, 2014, Copyright 2019 Ulysses GmbH & Co.KG.*
(Continued)

*Primary Examiner* — Stephen S Hong
*Assistant Examiner* — Matthew J Ludwig
(74) *Attorney, Agent, or Firm* — Ladas & Parry, LLP

(57) ABSTRACT

The present disclosure provides a method and apparatus for building pages, an apparatus and a non-volatile computer storage medium. According to embodiments of the present disclosure, the initial document content of the page to be published is obtained so that page resources of the page to be published are generated according to the document arrangement information and the initial document content.

(Continued)

Obtain initial document content of a page to be published — 101

According to document arrangement information and the initial document content, generate page resources of the page to be published — 102

Manual operations are not needed. This enables simple operations, a short operation duration and a high correctness rate, and thereby improves the page-building efficiency and reliability.

15 Claims, 1 Drawing Sheet

(51) Int. Cl.

| | | |
|---|---|---|
| *G06F 9/44* | (2018.01) | |
| *G06F 9/451* | (2018.01) | |
| *G06F 16/958* | (2019.01) | |
| *G06F 8/51* | (2018.01) | |
| *G06F 8/65* | (2018.01) | |
| *G06F 40/143* | (2020.01) | |
| *G06F 16/93* | (2019.01) | |
| *G06F 8/71* | (2018.01) | |
| *G06F 8/33* | (2018.01) | |
| *G06F 40/186* | (2020.01) | |

(52) U.S. Cl.
CPC .............. *G06F 9/451* (2018.02); *G06F 16/93* (2019.01); *G06F 16/972* (2019.01); *G06F 16/986* (2019.01); *G06F 40/143* (2020.01); *G06F 8/33* (2013.01); *G06F 8/71* (2013.01); *G06F 40/186* (2020.01)

(58) Field of Classification Search
CPC . G06F 8/51; G06F 8/65; G06F 16/986; G06F 40/186
USPC ......................................... 715/229, 234, 255
See application file for complete search history.

(56) References Cited

U.S. PATENT DOCUMENTS

| | | | | |
|---|---|---|---|---|
| 9,069,851 | B2* | 6/2015 | Van Wie ................. | H04L 41/22 |
| 9,135,358 | B2* | 9/2015 | Campbell ............. | G06F 16/245 |
| 9,230,601 | B2* | 1/2016 | Cohen ................. | G11B 27/034 |
| 9,646,064 | B2* | 5/2017 | Shmulevich ............. | G06F 8/30 |
| 9,710,439 | B1* | 7/2017 | Totale ................... | G06F 40/134 |
| 9,817,854 | B2* | 11/2017 | Marquardt ........ | G06F 16/24539 |
| 10,277,682 | B2* | 4/2019 | Biswas ................... | H04W 4/38 |
| 10,474,478 | B2* | 11/2019 | Sivertson ................ | G06F 8/433 |
| 2002/0065976 | A1 | 5/2002 | Kahn et al. | |
| 2003/0025728 | A1* | 2/2003 | Ebbo ......................... | G06F 8/30 |
| | | | | 715/744 |
| 2004/0128309 | A1* | 7/2004 | Gurney ................. | G06F 3/0482 |
| 2004/0194027 | A1* | 9/2004 | Suzuki ................. | G06F 40/117 |
| | | | | 715/209 |
| 2006/0174196 | A1* | 8/2006 | Zhang ..................... | G06F 9/454 |
| | | | | 715/236 |
| 2007/0033154 | A1* | 2/2007 | Trainum ................. | G06F 16/93 |
| 2007/0214237 | A1 | 9/2007 | Stibel et al. | |
| 2008/0005721 | A1 | 1/2008 | Harvey et al. | |
| 2011/0167335 | A1* | 7/2011 | Nickas, Jr. ................ | G06F 8/20 |
| | | | | 715/235 |
| 2013/0067319 | A1* | 3/2013 | Olszewski ............ | G06F 17/218 |
| | | | | 715/234 |

FOREIGN PATENT DOCUMENTS

| | | |
|---|---|---|
| CN | 102637184 A | 8/2012 |
| CN | 102662993 A | 9/2012 |
| CN | 102663078 A | 9/2012 |
| CN | 102681841 A | 9/2012 |
| CN | 103578016 A | 2/2014 |
| CN | 103677779 A | 3/2014 |
| CN | 103942036 A | 7/2014 |
| CN | 104142826 A | 11/2014 |
| CN | 104462131 A | 3/2015 |
| JP | 2003108475 A | 4/2003 |
| JP | 2004206203 A | 7/2004 |
| JP | 2008123213 A | 5/2008 |
| JP | 201552821 A | 3/2015 |

OTHER PUBLICATIONS

International Search Report for PCT/CN2015/093382, dated Jun. 17, 2015, and its English translation provided by WIPO.
Written Opinion of the International Search Authority for PCT/CN2015/093382, dated Jun. 17, 2016, and its English translation provided by WIPO.
From Chinese Application No. 2014103641360, Search Report dated Nov. 25, 2016.
From Chinese Application No. 2014103641360, Office Action dated Dec. 5, 2016 with machine English translation from Global Dossier.
From Chinese Application No. 2014103641360, Office Action dated Jul. 17, 2017 with machine English translation from Global Dossier.
From Chinese Application No. 2014103641360, Rejection Decision dated Nov. 6, 2017 with machine English translation from Google.
International Search Report for PCT/CN2014/093749, dated Apr. 28, 2015, and its English translation provided by WIPO.
Written Opinion of the International Search Authority for PCT/CN2014/093749, dated Apr. 28, 2015, and its English translation provided by WIPO.
International Preliminary Report on Patentability (IPRP; Ch. 1) for PCT/CN2014/093749, dated Feb. 9, 2017, and its English translation by WIPO.
First Office Action and Search Report from CN app. No. 201510612614. X, dated Feb. 11, 2019, with English translation from Global Dossier.
Second Office Action and Supplementary Search Report from CN app. No. 201510612614X, dated Jul. 10, 2019, with English translation from Global Dossier.
Third Office Action from CN app. No. 201510612614X, dated Oct. 22, 2019, with English translation from Global Dossier.
Notice of Reasons for Refusal from JP app. No. 2018-513673, dated May 14, 2019, with English translation provided by Global Dossier.
Decision of Refusal from JP app. No. 2018-513673, dated Feb. 4, 2020, with English translation provided by Global Dossier.
Waits, Todd et al., "Continuous System and User Documentation Integration", 2014 IEEE International Professional Communication Conference, United States, Oct. 14, 2014.transl.
"Markdown + Pandoc →HTML", Dec. 2, 2013, http://ju.outofmemory.cn/entry/90568.
Notification of Reason for Refusal from KR app. No. 10-2018-7007492, dated Apr. 30, 2019, with English translation from Global Dossier.
Notification of Reason for Refusal from KR app. No. 10-2018-7007492, dated Jan. 29, 2020, with English translation from Global Dossier.
Extended European Search Report from EP app. No. 15904590.5, dated Dec. 4, 2018.
Decision of Rejection from CN app. No. 201510612614.X, dated Feb. 19, 2020, with machine English translation provided by Google Translate.

\* cited by examiner

METHOD AND APPARATUS FOR BUILDING PAGES, APPARATUS AND NON-VOLATILE COMPUTER STORAGE MEDIUM

The present application is the U.S. national phase of PCT Application No. PCT/CN2015/093382 filed on Oct. 30, 2015, which claims priority to the Chinese patent application No.201510612614.X entitled "Method and Apparatus for Building Pages" filed on the filing date Sep. 23, 2015, the disclosures of which are incorporated herein by reference in its their entireties.

FIELD OF THE DISCLOSURE

The present disclosure relates to resource processing technologies, and particularly to a method and apparatus for building pages, an apparatus and a non-volatile computer storage medium.

BACKGROUND OF THE DISCLOSURE

A website refers to a set of relevant web pages which are built according to certain rules using a programming language and used to display specific content. That is to say, the website is a tool for communication, for example, a website in a content-publishing type may publish content the website itself wants to publish, or a website is used to provide relevant services. The Internet user may access a website through a browser application or a specific application (APP) corresponding to the website to obtain the content that he needs or uses the services. In the prior art, a developer may, with respect to the website's demands for services, e.g., content publication, build a desired implementation logic architecture, namely, page resources, for pages that form the website.

Usually, during page building, a lot of manual operations are needed, which causes complicated operations, a long operation duration and possible faults, and thereby causes reduced page-building efficiency and reliability.

SUMMARY OF THE DISCLOSURE

A plurality of aspects of the present disclosure provide a method and apparatus for building pages, an apparatus and a non-volatile computer storage medium, to improve the page-building efficiency and reliability.

According to an aspect of the present disclosure, there is provided a method for building pages, comprising:

obtaining initial document content of a page to be published;

according to document arrangement information and the initial document content, generating page resources of the page to be published.

The above aspect and any possible implementation mode further provide an implementation mode: before obtaining initial document content of the page to be published, the method further comprises:

using a lightweight markup language to perform content editing processing to obtain the initial document content of the page to be published.

The above aspect and any possible implementation mode further provide an implementation mode: the lightweight markup language comprises Markdown markup language, Textile markup language or reStructured markup language.

The above aspect and any possible implementation mode further provide an implementation mode: the initial document content comprises arrangement description data to indicate the document arrangement information; before generating page resources of the page to be published, according to document arrangement information and the initial document content, the method further comprises:

obtaining the document arrangement information according to the arrangement description data.

The above aspect and any possible implementation mode further provide an implementation mode: after generating page resources of the page to be published, according to document arrangement information and the initial document content, the method further comprises:

determining that the content of the page to be published undergoes update;

obtaining updated document content of the page to be published; and updating page resources of the page to be published, according to the document arrangement information and the updated document content.

The above aspect and any possible implementation mode further provide an implementation mode: the determining that the content of the page to be published undergoes update comprises:

determine that the content of the page to be published undergoes update according to a current document content version identifier of the page to be published.

According to another aspect of the present disclosure, there is provided an apparatus for building pages, comprising:

an obtaining unit configured to obtain initial document content of a page to be published;

a building unit configured to, according to document arrangement information and the initial document content, generate page resources of the page to be published.

The above aspect and any possible implementation mode further provide an implementation mode: the apparatus further comprises a content unit configured to use a lightweight markup language to perform content editing processing to obtain the initial document content of the page to be published.

The above aspect and any possible implementation mode further provide an implementation mode: the lightweight markup comprises Markdown markup language, Textile markup language or reStructured markup language.

The above aspect and any possible implementation mode further provide an implementation mode: the initial document content comprises arrangement description data to indicate the document arrangement information; the building unit is further configured to obtain the document arrangement information according to the arrangement description data.

The above aspect and any possible implementation mode further provide an implementation mode: the building unit is further configured to determine that the content of the page to be published undergoes update;

obtain updated document content of the page to be published; and update page resources of the page to be published, according to the document arrangement information and the updated document content.

The above aspect and any possible implementation mode further provide an implementation mode: the building unit is specifically configured to determine that the content of the page to be published undergoes update according to a current document content version identifier of the page to be published.

According to a further aspect of the present disclosure, there is provided an apparatus, comprising
one or more processors;
a memory;
one or more programs stored in the memory and configured to execute the following operations when executed by the one or more processors:
obtaining initial document content of a page to be published;
according to document arrangement information and the initial document content, generating page resources of the page to be published.

According to a further aspect of the present disclosure, there is provided a non-volatile computer storage medium in which one or more programs are stored, an apparatus being enabled to execute the following operations when said one or more programs are executed by the apparatus:
obtaining initial document content of a page to be published;
according to document arrangement information and the initial document content, generating page resources of the page to be published.

As known from the above technical solutions, the initial document content of the page to be published is obtained so that page resources of the page to be published are generated according to the document arrangement information and the initial document content. Manual operations are not needed. This enables simple operations, a short operation duration and a high correctness rate, and thereby improves the page-building efficiency and reliability.

In addition, according to the technical solution provided by the present disclosure, since manual operations are not needed any longer and the page-building flow is completely performed automatically, the duration of the page-building flow can be substantially shortened, and the user's experience can be improved effectively.

In addition, the technical solution provided by the present disclosure is employed to determine that the content of the page to be published undergoes update and thereby obtain the updated document content of the page to be published, so that the page resources of the page to be published are updated according to the document arrangement information and the updated document content, and the reliability of the page can be improved effectively.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
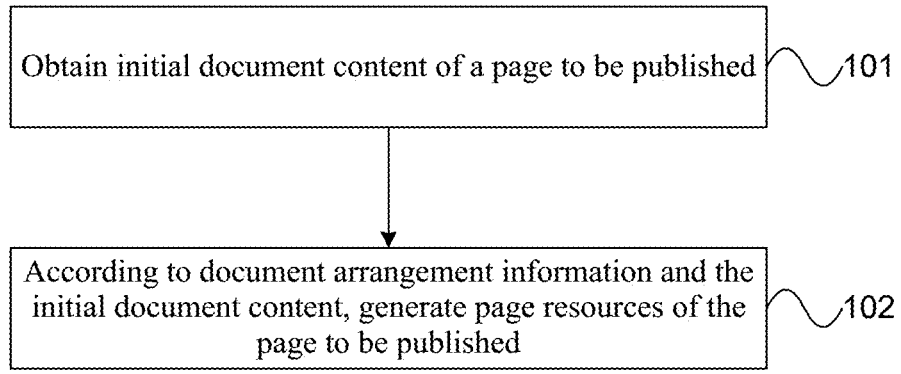
FIG. 1 is a flow chart of a method for building pages according to an embodiment of the present disclosure.

FIG. 1 is a flow chart of a method for building pages according to an embodiment of the present disclosure.

101: obtaining initial document content of a page to be published.

The so-called initial document content refers to content of documents of a page to be published, wherein the word "initial" does not have any special sense and is only used to distinguish from subsequent "updated document content".

102: according to document arrangement information and the initial document content, generating page resources of the page to be published.

The so-called document arrangement information means arranging the initial document content according to page demands of the page to be published according to a certain order, layout or the like, to make them become page description information of the page to be published.

It needs to be appreciated that subjects for executing 101-102 may partially or totally be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

As such, the initial document content of the page to be published is obtained so that page resources of the page to be published are generated according to the document arrangement information and the initial document content. Manual operations are not needed. This enables simple operations, a short operation duration and a high correctness rate, and thereby improves the page-building efficiency and reliability.

In the present embodiment, since the page resources of the page to be published is generated according to the initial document content, it can be seen that the document content of the page to be published have already been pre-embedded into the page resources of the page to be published. Therefore, an extra database is not needed to store the document content of the page to be published, which can avoid the technical problem about the excessive display duration of the page to be published because the document content of the page to be published is obtained from the database only when the user parses the page resources during access to the page to be published. As such, the display efficiency of the page to be published can be effectively improved.

Optionally, in a possible implementation mode of the present embodiment, before 101, the method may further comprise using a lightweight markup language to perform content editing processing to obtain the initial document content of the page to be published.

Specifically, the so-called lightweight markup language marks documents in different manners and is designed with grammar that is simple and easy to read. In fact, its grammar is very simple and only uses a simple format and several simple special characters or character strings to mark content such as paragraph title, listing, table, reference and font.

For example, the lightweight markup language such as Markdown markup language, Textile markup language or reStructured markup language may be employed to perform content editing processing.

In a specific implementation procedure, after the initial document content of the page to be published is obtained, the obtained initial document content of the page to be published may be submitted to a document library to execute 101, that is, the initial document content of the page to be published is obtained from the document library.

Optionally, in a possible implementation mode of the present embodiment, in 102, the employed document arrangement information refer to page resources of a template page, wherein the page resources include a page main resource and a page sub-resource.

The so-called page may also be called World Wide Web (Web) page, it may be a webpage written based on Hyper-Text Markup Language (HTML), namely, a HTML page, or may further be a webpage written based on HTML and Java language, namely, JavaServer Page (JSP), or may further be a webpage written in other languages. This is not particularly limited in the present embodiment.

The page may comprise one or more page tag such as HTML tag and JSP tag; a defined display area is called a page element such as word, picture, hyperlink, button, input box, or drop-down box. This is not particularly limited in the present embodiment.

The so-called page main resource refers to a page source code such as an HTML page source code or JSP source code.

The so-called page sub-resource refers to some static resources linked by the page main resource, for example, JavaScript file, Cascading Style Sheets (CSS) resources or pictures.

Furthermore, there are many methods for determining the employed document arrangement information. This is not particularly limited in the present embodiment.

In a specific implementation procedure, default document arrangement information may be specifically determined as the employed document arrangement information.

In another specific implementation procedure, in addition to page content needed by the page to be published, the initial document content may further comprise arrangement description data such as layout, knowledges or the like to indicate the document arrangement information; correspondingly, the document arrangement information may be obtained according to the arrangement description data.

In the present disclosure, the page resources of the page to be published are generated according to the page resources of the template page and the obtained document content, whereupon a complete page is successfully built so far. When the user accesses the page to be published, the HTML source code corresponding to the page source code of the page to be published is provided to the application of the page accessed by the user so that the page displays the page to be published to the user according to the HTML source code corresponding to the page source code.

Optionally, in a possible implementation mode of the present embodiment, after 102, it is further feasible to monitor changes of the content of the page to be published, for example, addition, deletion, modification or the like of the initial document content, and determine whether the content of the page to be published undergoes update.

If the content of the page to be published is determined as having undergone update, updated document content of the page to be published may be obtained. Then, the page resources of the page to be published are updated according to the document arrangement information and the updated document content.

In another specific implementation procedure, it is feasible to perform version management for the document content on basis of which the page sources of the page to be published are generated each time. Specifically, it is feasible to perform version marking for the document content on basis of which the page sources of the page to be published are generated each time, namely, allocate a document content version identifier for the document content on basis of which the page sources of the page to be published are generated each time. Specifically, it is feasible to determine whether the content of the page to be published undergoes update according to the current document content version identifier of the page to be published.

For example, if the current document content version identifier of the page to be published is consistent with the initial document content version identifier of the page to be published obtained in the latest time, this indicates the content of the page to be published does not change, and it is determined that the content of the page to be published does not undergo update; if the current document content version identifier of the page to be published is inconsistent with the initial document content version identifier of the page to be published obtained in the latest time, this indicates the content of the page to be published changes, and it is determined that the content of the page to be published has undergone update.

In the present embodiment, the initial document content of the page to be published is obtained so that page resources of the page to be published are generated according to the document arrangement information and the initial document content. Manual operations are not needed. This enables simple operations, a short operation duration and a high correctness rate, and thereby improves the page-building efficiency and reliability.

In addition, according to the technical solution provided by the present disclosure, since manual operations are not needed any longer and the page-building flow is completely performed automatically, the duration of the page-building flow can be substantially shortened, and the user's experience can be improved effectively.

In addition, the technical solution provided by the present disclosure is employed to determine that the content of the page to be published undergoes update and thereby obtain the updated document content of the page to be published, so that the page resources of the page to be published are updated according to the document arrangement information and the updated document content, and the reliability of the page can be improved effectively.

The technical solution according to the present disclosure further has the following advantages:

1. The flow is highly automated

After the initial document content of the page to be published is completed by editing and submitted to the document library, the page to be published can be seen online within a very short time period, without requiring any manual intervention.

2. Lightweight architecture without extra dependency

An online website no longer needs a database to store the document content, and only needs the support of the Web server which is the most fundamental of the web site.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
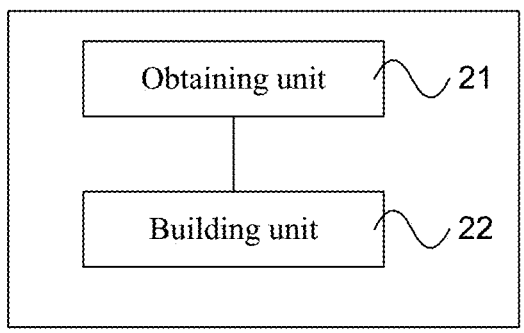
FIG. 2 is a block diagram of an apparatus for building pages according to another embodiment of the present disclosure.

FIG. 2 is a block diagram of an apparatus for building pages according to another embodiment of the present disclosure. The apparatus for building pages according to the present embodiment may comprise an obtaining unit 21 and a building unit 22, wherein the obtaining unit 21 is configured to obtain initial document content of a page to be published; and the building unit 22 is configured to, according to document arrangement information and the initial document content, generate page resources of the page to be published.

It needs to be appreciated that apparatus for building pages according to the present embodiment may partially or totally be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

Figure 3:
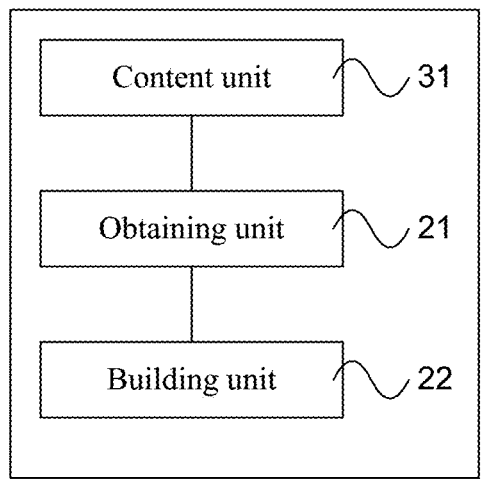
FIG. 3 is a block diagram of an apparatus for building pages according to a further embodiment of the present disclosure.

Optionally, in a possible implementation mode of the present embodiment, as shown in FIG. 3, the apparatus for building pages according to the present embodiment may further comprise a content unit 31 configured to use a lightweight markup language to perform content editing processing to obtain the initial document content of the page to be published.

For example, the lightweight markup language such as Markdown markup language, Textile markup language or reStructured markup language may be employed to perform content editing processing.

Optionally, in a possible implementation mode of the present embodiment, the initial document content may comprise arrangement description data to indicate the document arrangement information; correspondingly, the building unit 22 may further be configured to obtain the document arrangement information according to the arrangement description data.

Optionally, in a possible implementation mode of the present embodiment, the building unit 22 may further be configured to determine that the content of the page to be published undergoes update; obtain updated document content of the page to be published; and update page resources of the page to be published according to document arrangement information and the updated document content.

In a specific implementation mode, the building unit 22 may be specifically configured to determine that the content of the page to be published undergoes update according to a current document content version identifier of the page to be published.

It needs to be appreciated that the method in the embodiment corresponding to FIG. 1 may be implemented by the apparatus for building pages according to the present embodiment. Reference may be made to relevant resources in the embodiment corresponding to FIG. 1 for detailed description, which will not be detailed any longer here.

In the present embodiment, the initial document content of the page to be published is obtained by the obtaining unit so that the building unit can generate page resources of the page to be published according to the document arrangement information and the initial document content. Manual operations are not needed. This enables simple operations, a short operation duration and a high correctness rate, and thereby improves the page-building efficiency and reliability.

In addition, according to the technical solution provided by the present disclosure, since manual operations are not needed any longer and the page-building flow is completely performed automatically, the duration of the page-building flow can be substantially shortened, and the user's experience can be improved effectively.

In addition, the technical solution provided by the present disclosure is employed to determine that the content of the page to be published undergoes update and thereby obtains the updated document content of the page to be published, so that the page resources of the page to be published are updated according to the document arrangement information and the updated document content, and the reliability of the page can be improved effectively.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A method for building webpages, wherein the method comprises:
    obtaining initial document content of a webpage to be published;
    according to document arrangement information and the initial document content, generating page resources of the webpage to be published,
    wherein the document arrangement information is page resources of a template page, and wherein the page resources of the template page comprises a page main resource and a page sub-resource, wherein the page main resource is a page source code and the page sub-resource is static resources linked by the page main resource,
    wherein the initial document content comprises arrangement description data to indicate the document arrangement information; before generating page resources of the webpage to be published, according to document arrangement information and the initial document content, the method further comprises:
    obtaining the document arrangement information according to the arrangement description data.

2. The method according to claim 1, wherein before obtaining initial document content of the webpage to be published, the method further comprises:
    using a lightweight markup language to perform content editing processing to obtain the initial document content of the webpage to be published.

3. The method according to claim 2, wherein the lightweight markup language comprises Markdown markup language, Textile markup language or reStructured markup language.

4. The method according to claim 1, wherein after generating page resources of the webpage to be published, according to the document arrangement information and the initial document content, the method further comprises:
    determining that the content of the webpage to be published undergoes update;
    obtaining updated document content of the webpage to be published;
    updating page resources of the webpage to be published, according to the document arrangement information and the updated document content.

5. The method according to claim 4, wherein the determining that the content of the webpage to be published undergoes update comprises:
    determining that the content of the webpage to be published undergoes update according to a current document content version identifier of the webpage to be published.

6. An apparatus, comprising
    one or more processors;
    a memory;
    one or more programs stored in the memory and configured to execute the following operation when executed by the one or more processors:
    obtaining initial document content of a webpage to be published;
    according to document arrangement information and the initial document content, generating webpage resources of the webpage to be published,
    wherein the document arrangement information is page resources of a template page, and wherein the page resources of the template page comprises a page main resource and a page sub-resource, wherein the page main resource is a page source code and the page sub-resource is static resources linked by the page main resource,
    wherein the initial document content comprises arrangement description data to indicate the document arrangement information; before generating page resources of the webpage to be published, according to document arrangement information and the initial document content, the operation further comprises:
    obtaining the document arrangement information according to the arrangement description data.

7. The apparatus according to claim 6, wherein before obtaining initial document content of the webpage to be published, the operation further comprises:
    using a lightweight markup language to perform content editing processing to obtain the initial document content of the webpage to be published.

8. The apparatus according to claim 7, wherein the lightweight markup language comprises Markdown markup language, Textile markup language or reStructured markup language.

9. The apparatus according to claim 6, wherein after generating page resources of the webpage to be published, according to the document arrangement information and the initial document content, the operation further comprises:
    determining that the content of the webpage to be published undergoes update;
    obtaining updated document content of the webpage to be published;
    updating page resources of the webpage to be published, according to the document arrangement information and the updated document content.

10. The apparatus according to claim 9, wherein the operation of determining that the content of the webpage to be published undergoes update comprises:

determining that the content of the webpage to be published undergoes update according to a current document content version identifier of the webpage to be published.

11. A non-transitory computer storage medium in which one or more programs are stored, an apparatus being enabled to execute the following operations when said one or more programs are executed by the apparatus:

obtaining initial document content of a webpage to be published;

according to document arrangement information and the initial document content, generating page resources of the webpage to be published, wherein the document arrangement information is page resources of a template page, and wherein the page resources of the template page comprises a page main resource and a page sub-resource, wherein the page main resource is a page source code and the page sub-resource is static resources linked by the page main resource, wherein the initial document content comprises arrangement description data to indicate the document arrangement information; before generating page resources of the webpage to be published, according to document arrangement information and the initial document content, the operation further comprises:

obtaining the document arrangement information according to the arrangement description data.

12. The non-transitory computer storage medium according to claim 11, wherein before obtaining initial document content of the webpage to be published, the operation further comprises:

using a lightweight markup language to perform content editing processing to obtain the initial document content of the webpage to be published.

13. The non-transitory computer storage medium according to claim 12, wherein the lightweight markup language comprises Markdown markup language, Textile markup language or reStructured markup language.

14. The non-transitory computer storage medium according to claim 11, wherein after generating page resources of the webpage to be published, according to the document arrangement information and the initial document content, the operation further comprises:

determining that the content of the webpage to be published undergoes update;

obtaining updated document content of the webpage to be published;

updating page resources of the webpage to be published, according to the document arrangement information and the updated document content.

15. The non-transitory computer storage medium according to claim 14, wherein the operation of determining that the content of the webpage to be published undergoes update comprises:

determining that the content of the webpage to be published undergoes update according to a current document content version identifier of the webpage to be published.

* * * * *